(12) United States Patent
Rak et al.

(10) Patent No.: US 8,254,564 B2
(45) Date of Patent: Aug. 28, 2012

(54) KEYPAD HAVING KEYS WITH ANGLED ENGAGEMENT SURFACES, AND ASSOCIATED HANDHELD ELECTRONIC DEVICE

(75) Inventors: Roman P. Rak, Waterloo (CA); Jason T. Griffin, Kitchener (CA)

(73) Assignee: Research In Motion Limited, Waterloo, ON (CA)

( * ) Notice: Subject to any disclaimer, the term of this patent is extended or adjusted under 35 U.S.C. 154(b) by 1193 days.

(21) Appl. No.: 11/554,331

(22) Filed: Oct. 30, 2006

(65) Prior Publication Data

US 2008/0101594 A1    May 1, 2008

(51) Int. Cl.
*H04M 1/00* (2006.01)
*H04M 9/00* (2006.01)

(52) U.S. Cl. .................................................. 379/433.07

(58) Field of Classification Search ............. 379/433.07; 345/156, 168, 169, 170, 172; 341/22, 27
See application file for complete search history.

(56) References Cited

U.S. PATENT DOCUMENTS

| | | | | |
|---|---|---|---|---|
| 3,945,482 A * | 3/1976 | Einbinder | ...................... | 400/486 |
| 4,974,183 A * | 11/1990 | Miller | ........................... | 708/142 |
| 5,274,217 A * | 12/1993 | Kilian | ........................ | 235/145 R |
| 5,528,235 A * | 6/1996 | Lin et al. | .......................... | 341/22 |
| 5,861,823 A * | 1/1999 | Strauch et al. | ................... | 341/22 |
| 5,926,119 A * | 7/1999 | Lindeman et al. | ............... | 341/22 |
| 6,847,310 B1 * | 1/2005 | Gill et al. | ......................... | 341/22 |
| 7,182,533 B1 * | 2/2007 | Caplan | .......................... | 400/489 |

FOREIGN PATENT DOCUMENTS

| | | |
|---|---|---|
| EP | 1 156 643 A2 | 11/2001 |
| JP | 59 015276 A | 1/1984 |
| JP | 01 014626 A | 1/1989 |
| WO | 9424685 A | 10/1994 |
| WO | 2006130747 A | 12/2006 |

* cited by examiner

*Primary Examiner* — Davetta W Goins
*Assistant Examiner* — Phylesha Dabney
(74) *Attorney, Agent, or Firm* — Borden Ladner Gervais LLP; Jeffrey W. Wong

(57) ABSTRACT

An improved keypad for a handheld electronic device has keys wherein the engagement surface thereof is oriented oblique to the actuation axis of the key. The oblique arrangement of the engagement surfaces visually and tactually distinguishes one key from another, which facilitates their incorporation into various handheld electronic devices with relatively small form factors.

16 Claims, 11 Drawing Sheets

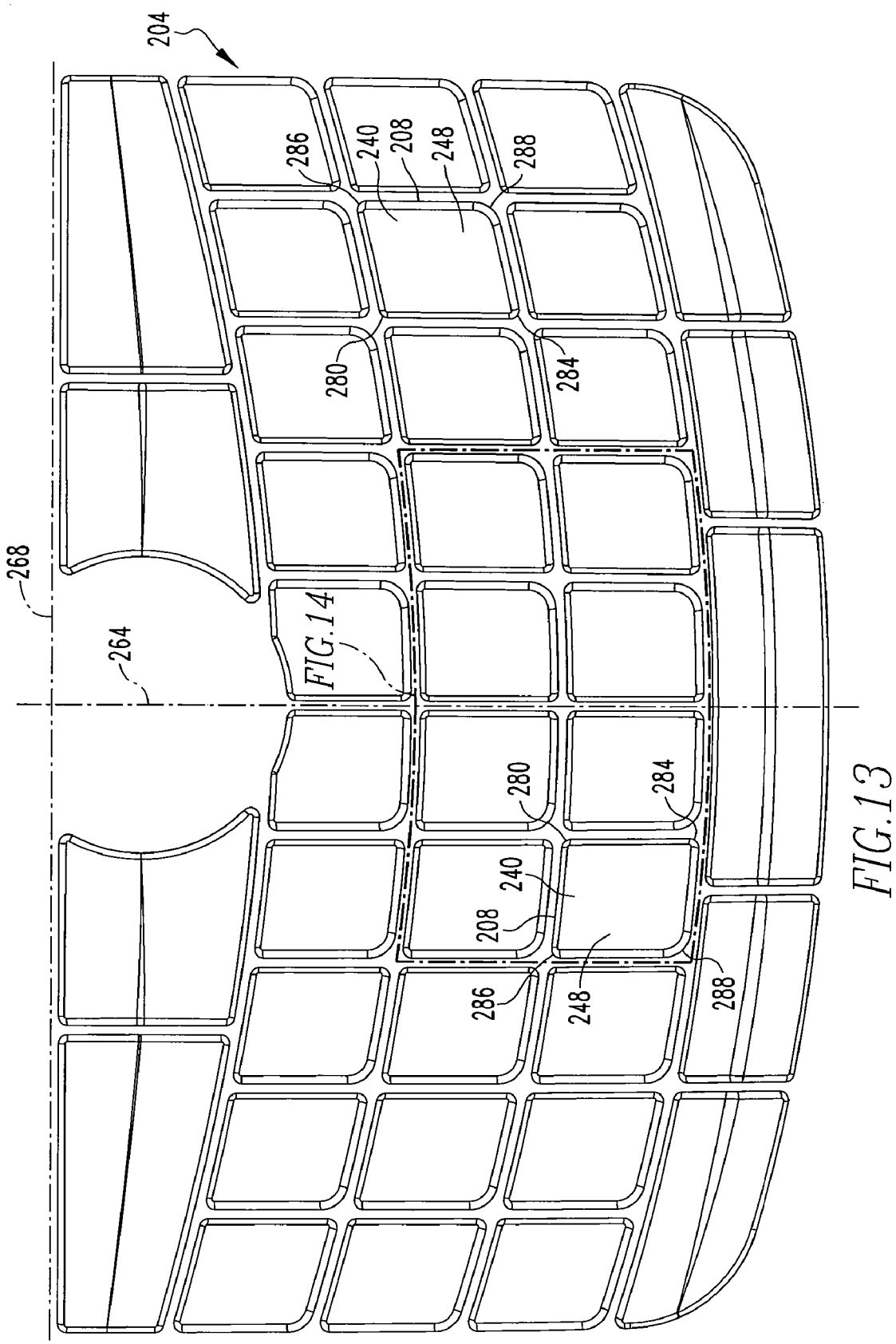

KEYPAD HAVING KEYS WITH ANGLED ENGAGEMENT SURFACES, AND ASSOCIATED HANDHELD ELECTRONIC DEVICE

BACKGROUND

1. Field

The disclosed and claimed concept relates generally to handheld electronic devices and, more particularly, to a keypad of a handheld electronic device.

2. Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature a wireless communication capability, although many such handheld electronic devices are stand-alone devices that are functional without communication with other devices.

Many handheld electronic devices include a keypad that comprises a plurality of keys that are actuatable in one fashion or another. With advances in technology, handheld electronic devices typically have progressively smaller form factors and provide progressively greater numbers of functions. However, a handheld electronic device having a small form factor typically must also have a small keypad which typically will have either relatively small keys and/or relatively few keys. Keys that are relatively small can be difficult for a user to locate and actuate during use of the handheld electronic device. It thus would be desirable to provide an improved keypad and handheld electronic device wherein the keys are configured to be relatively easy for a user to locate and to actuate.

BRIEF DESCRIPTION OF THE DRAWING

A full understanding of the disclosed and claimed concept can be gained from the following Description when read in conjunction with the accompanying drawings in which:

FIG. 13 is a front elevational view of an improved keypad in accordance with a third embodiment of the disclosed and claimed concept.

Similar numerals refer to similar parts throughout the specification.

DESCRIPTION

Figure 2:
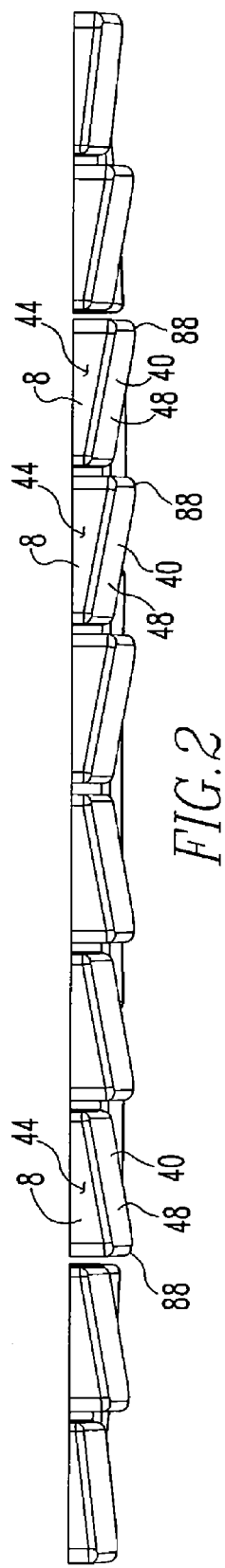
FIG. 2 is a sectional view as taken along Line 2-2 of FIG. 1.
Figure 2A:
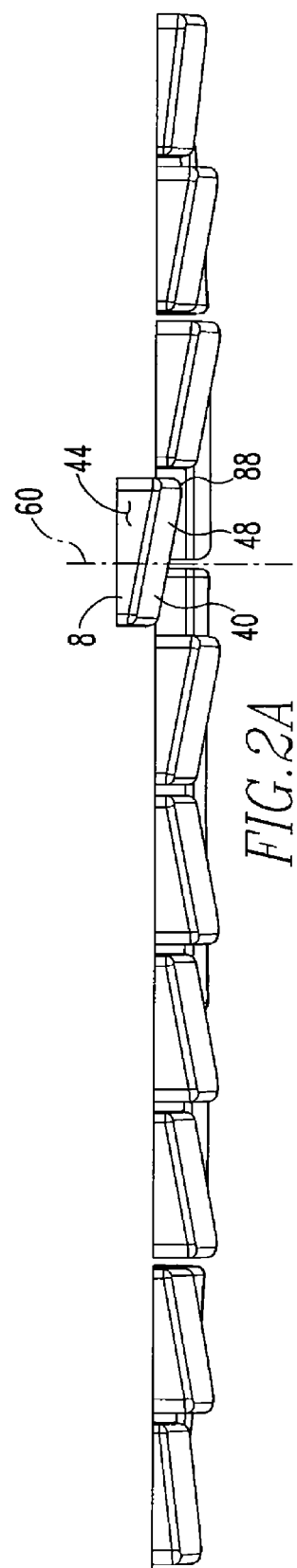
FIG. 2A is a view similar to FIG. 2, except depicting a portion of the keypad and a particular key thereof in an actuated condition.
Figure 4:
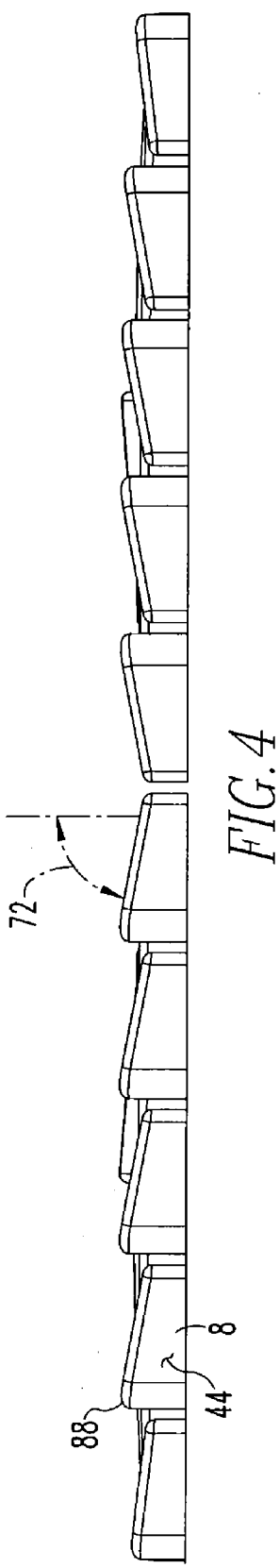
FIG. 4 is a sectional view as taken along Line 4-4 of FIG. 1.
Figure 3:
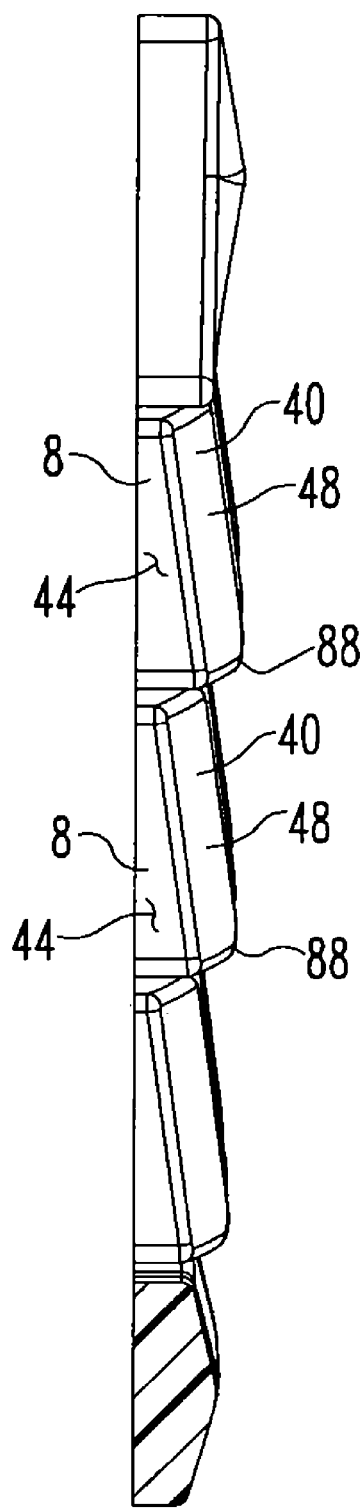
FIG. 3 is a sectional view as taken along Line 3-3 of FIG. 1.
Figure 3A:
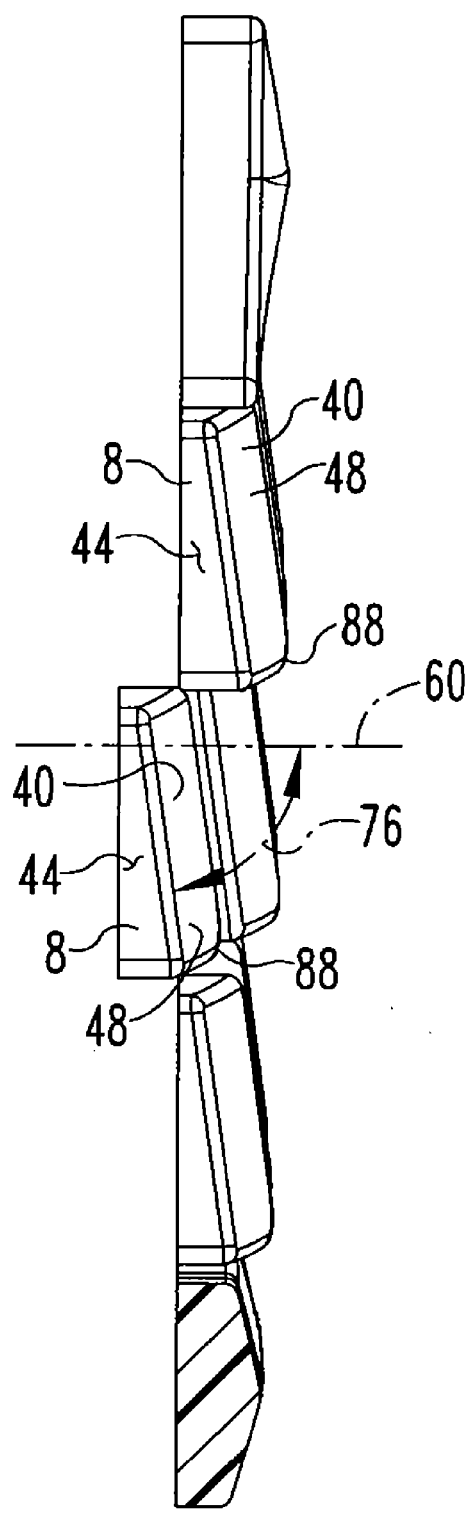
FIG. 3A is a view similar to FIG. 3, except depicting a portion of the keypad and depicting in an actuated condition the same key as is depicted in FIG. 2A as being in the actuated condition.

An improved keypad 4 in accordance with the disclosed and claimed concept is depicted generally in FIGS. 1-5. The keypad 4 includes a plurality of keys 8 that are actuatable between an unactuated condition, as is depicted in FIGS. 1, 2, 3, 4, and 5, and an actuated condition, as is depicted in an exemplary fashion in FIGS. 2A and 3A. The improved keypad 4 is advantageously arranged in a stepped layout that will be described in greater detail elsewhere herein. The improved keypad 4 can be incorporated into a handheld electronic device 12, such as is depicted in an exemplary fashion in FIG. 6 and is depicted in a schematic fashion in FIG. 6A.

The improved handheld electronic device 12 comprises an input apparatus 16, a processor apparatus 20, and an output apparatus 24. The input apparatus 16 includes the keypad 4 and can include other input members such as a trackball 26 and other such input members. The processor apparatus 20 comprises a processor 28, such as a microprocessor (μP) or other processor, and further comprises a memory 32 which can be any of a variety of known storage devices. The output apparatus 24 comprises a display 36. As a general matter, the memory 32 has stored therein a number of routines that are executable on the processor 28. The processor apparatus 20 receives input signals from the input apparatus 16 and provides output signals to the output apparatus 24. A key 8 in its actuated condition closes a circuit of the handheld electronic device 12 to provide an input to the processor apparatus 20.

The keys 8 each include an outer surface 40 and a skirt surface 44 which, in the depicted exemplary embodiment, are disposed adjacent one another. The outer surface 40 comprises an engagement surface 48 that is engageable by the user in actuating the key 8 between the unactuated and actuated conditions. In the exemplary depicted embodiment, a force applied to the engagement surface 48 of a key 8 overcomes a bias of the key 8 in an outward direction along an actuation axis 60 and translates the key 8 from the unactuated condition to the actuated condition. A release of the force allows the bias to return the key 8 from the actuated condition to the unactuated condition. It is noted, however, that the keys 8 in other embodiments could be configured in known fashions to be actuatable in a direction along their actuation axis 60 with minimal translation or with no translation without departing from the present concept.

Figure 1:
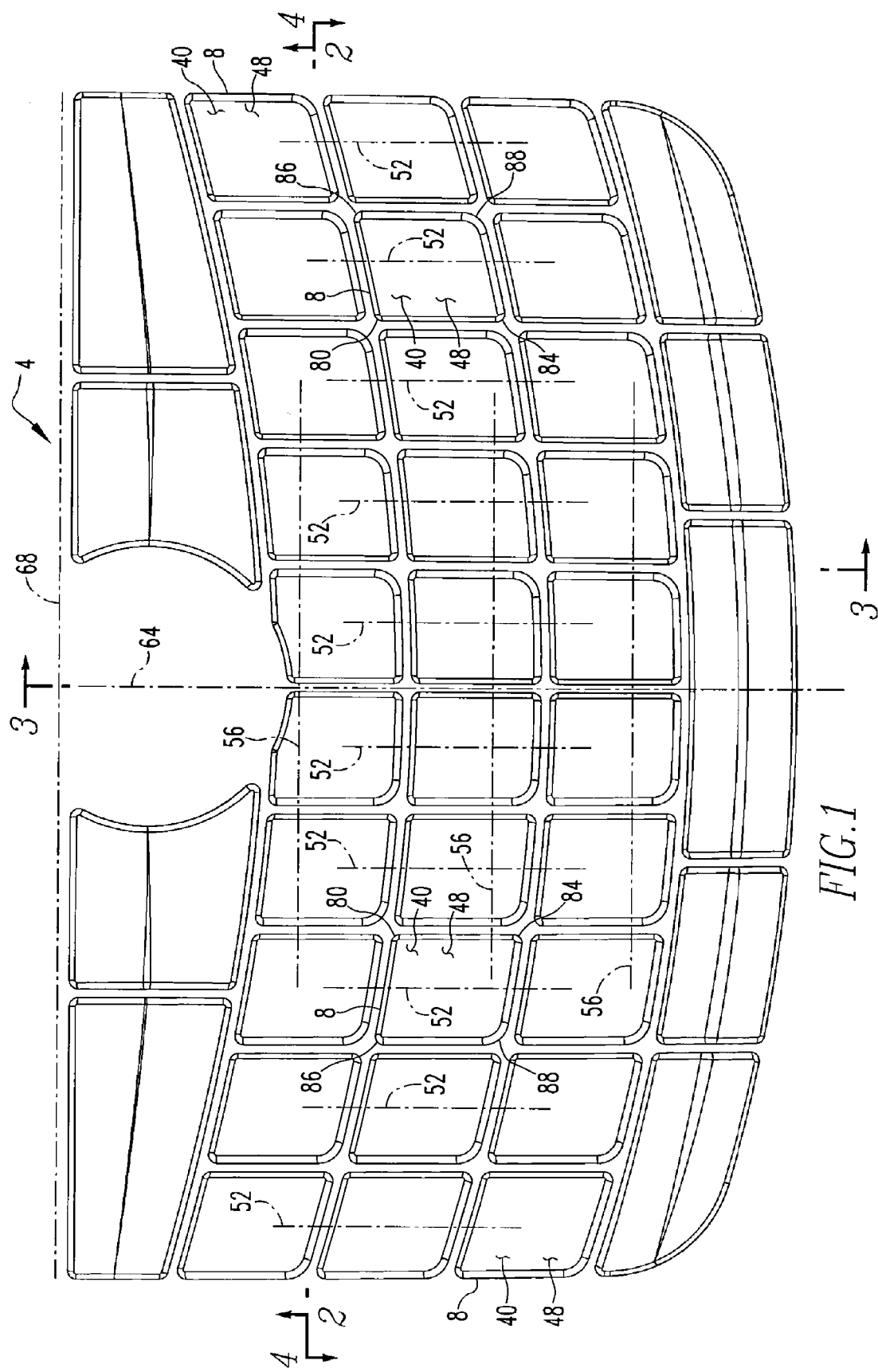
FIG. 1 is a front elevational view of an improved keypad in accordance with a first embodiment of the disclosed and claimed concept.

As is best shown in FIG. 1, the keys 8 are arranged in a plurality of columns 52 and in a plurality of rows 56. In the exemplary embodiment depicted herein, the columns 52 are straight and are parallel with one another. The rows 56 are parallel with one another and are generally curved. Since the curvature of each of the rows 56 is axisymmetric with respect to a first reference axis 64 of the keypad 4, each row 56 can be said to extend substantially parallel with a second reference axis 68 of the keypad 4.

Each key 8 is generally actuatable along its actuation axis 60 between the unactuated and actuated conditions. The actuation axis 60 is substantially orthogonal to the first reference axis 64 and the second reference axis 68. That is, the actuation axis 60, the first reference axis 64, and the second reference axis 68 are mutually substantially perpendicular to one another. The actuation axis 60 of a give key 8 may be parallel with the actuation axis 60 of one or more other keys 8, or may be nonparallel with the actuation axis 60 of each other key.

Figure 7:
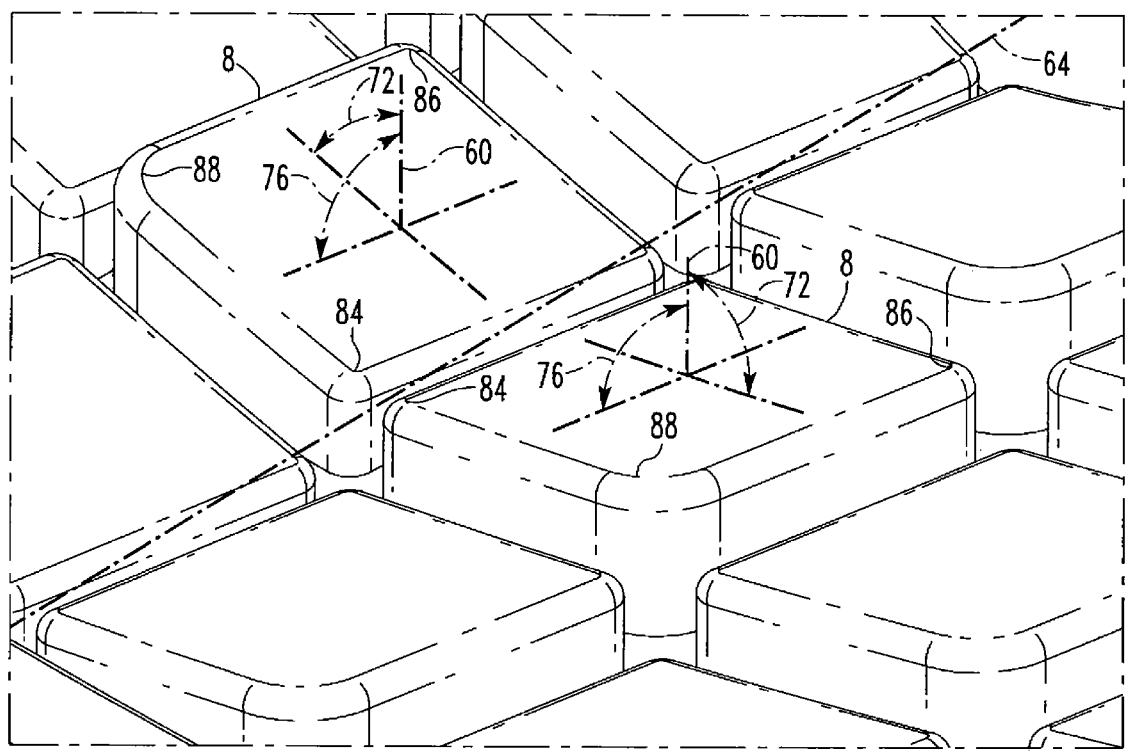
FIG. 7 is an enlarged view of a portion of the keypad of FIG. 5.
Figure 8:
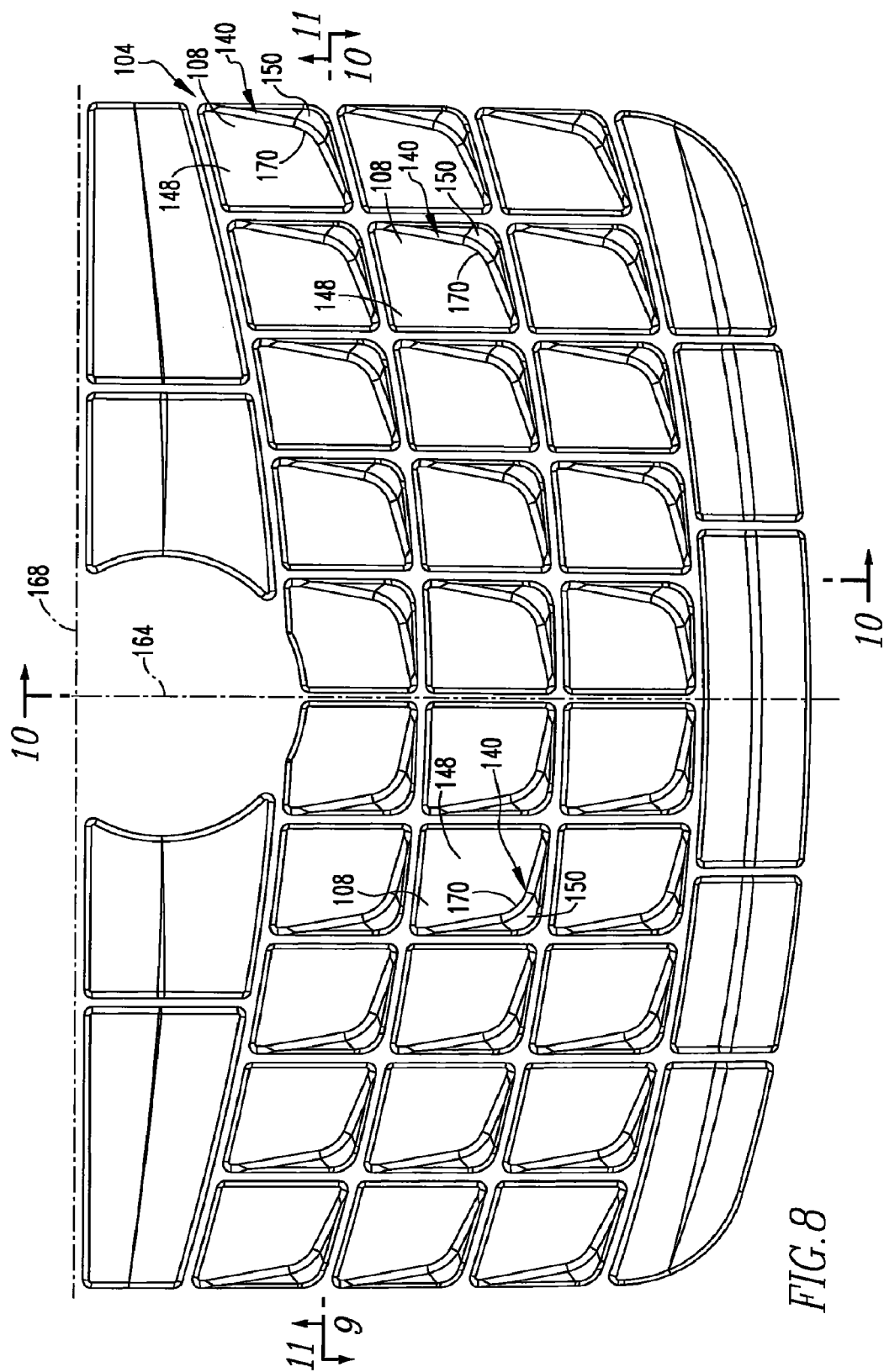
FIG. 8 is a front elevational view of an improved keypad in accordance with a second embodiment of the disclosed and claimed concept.
Figure 9:
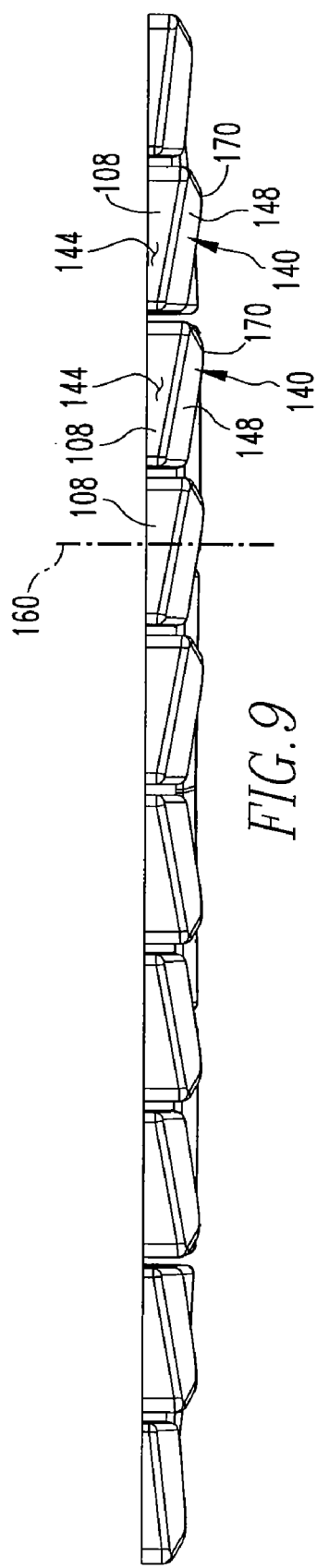
FIG. 9 is a sectional view as taken along Line 9-9 of FIG. 8.
Figure 11:
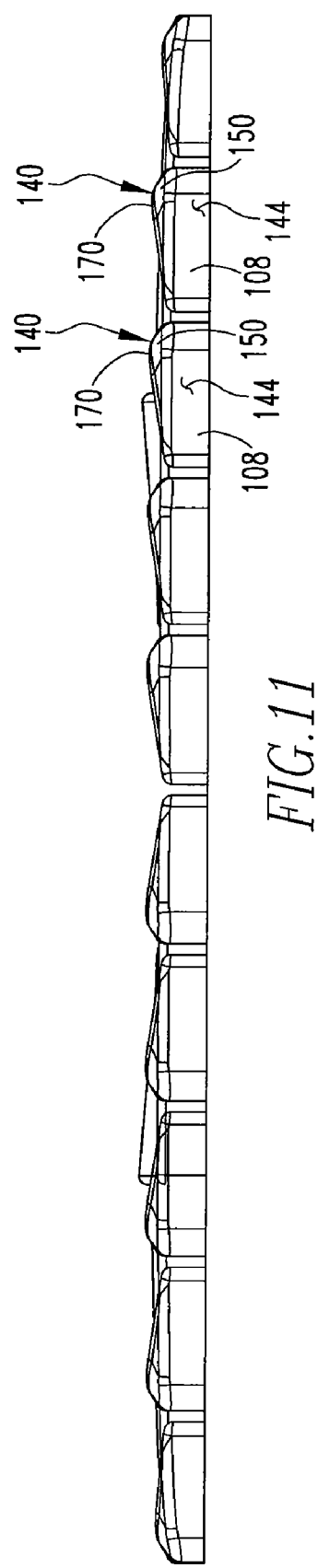
FIG. 11 is a sectional view as taken along Line 11-11 of FIG. 8.
Figure 12:
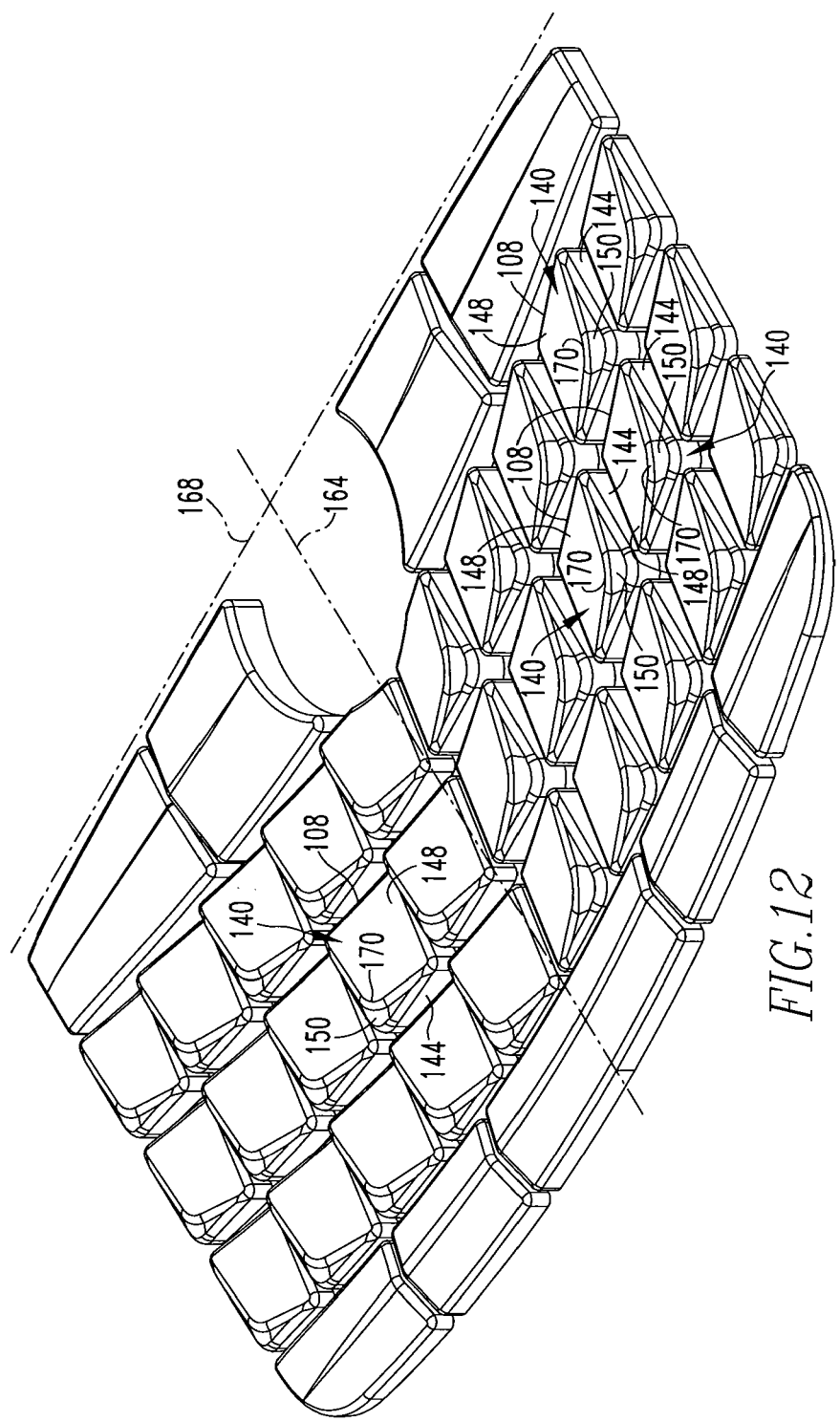
FIG. 12 is a perspective view of the keypad of FIG. 8.
Figure 10:
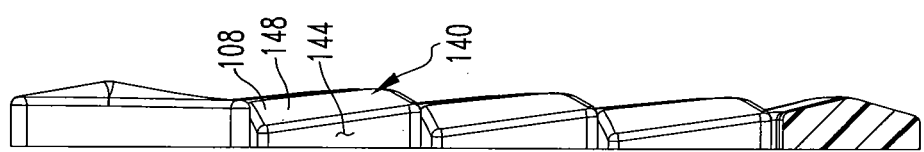
FIG. 10 is a sectional view as taken along Line 10-10 of FIG. 8.

In accordance with the disclosed and claimed concept, the engagement surface 48 of each of the keys 8 is oriented oblique to the actuation axis 60 thereof. As employed herein, the expression "oblique" and variations thereof shall refer broadly to a relationship that is neither parallel nor perpendicular. As can be seen in FIG. 7, the engagement surface 48 can be said to be oriented at a first angle 72 from the actuation axis 60 about an axis parallel with the first reference axis 64, and that the engagement surface 48 additionally is oriented at a second angle 76 from the actuation axis 60 about an axis parallel with the second reference axis 68, with the first and second angles 72 and 76 being oblique angles.

Figure 5:
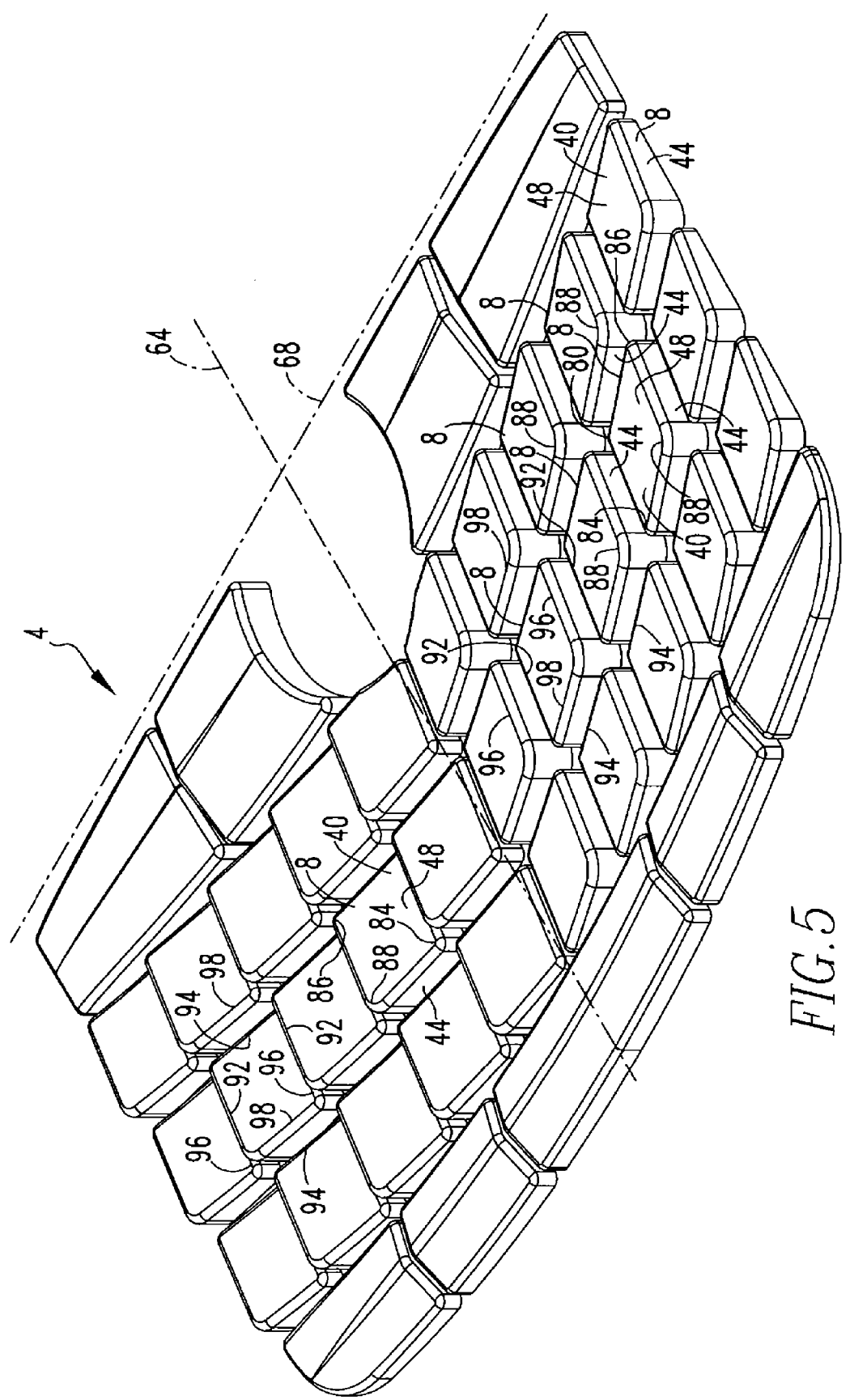
FIG. 5 is a perspective of the keypad of FIG. 1.
Figure 6:
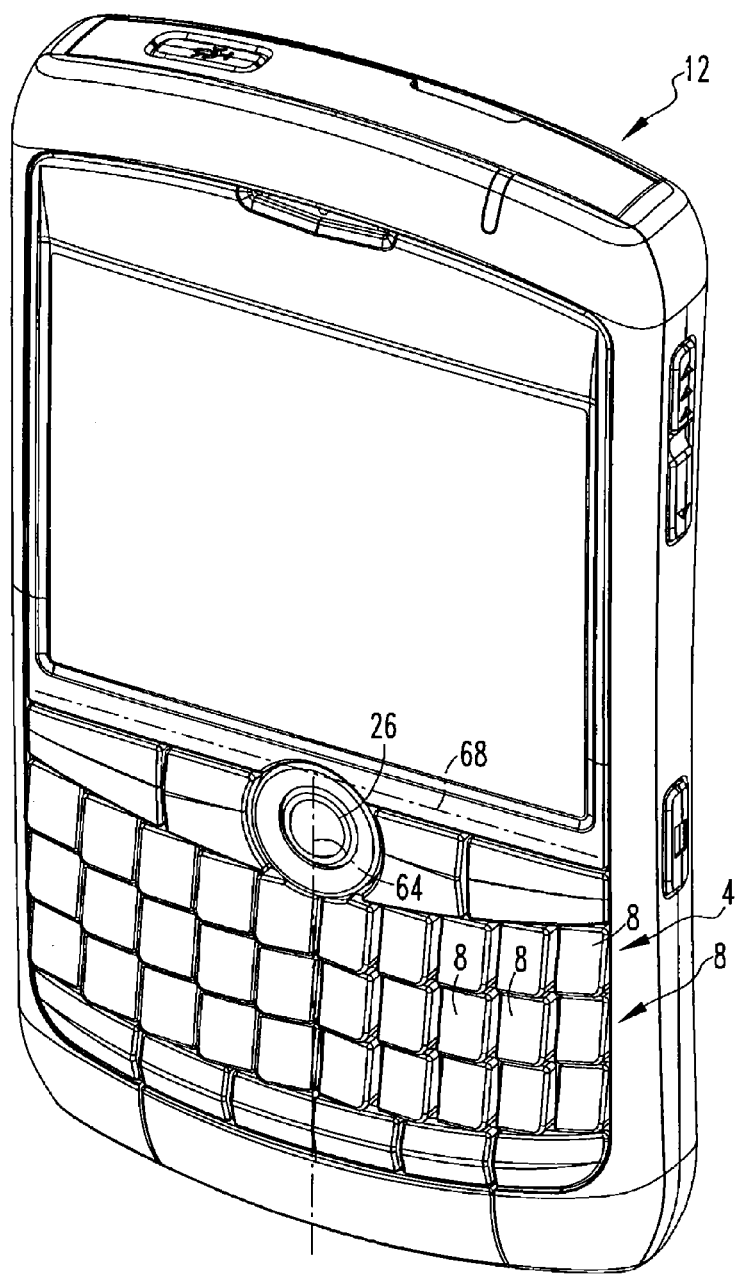
FIG. 6 is an improved handheld electronic device which, for example, incorporates the improved keypad of FIG. 1.
Figure 6A:
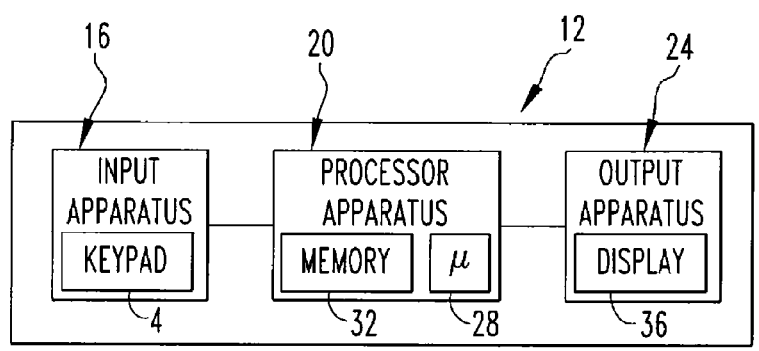
FIG. 6A is a schematic depiction of the handheld electronic device of FIG. 6.

As can be best seen in FIGS. 1, 5, and 6, the first reference axis 64 can be said to be oriented in a generally north-south direction with respect to the handheld electronic device 12, and that the second reference axis 68 extends in a generally east-west direction with respect to the handheld electronic device 12. The columns 52 can be said to be oriented substantially parallel with the first reference axis 64. The rows 56 can be said to extend, when considered in their entireties, generally parallel with the second reference axis 68. In the exemplary embodiment depicted herein, the first reference axis 64 extends generally centrally through the keypad 4. The second reference axis 68 extends adjacent the keypad 4 between the keypad 4 and the display 36.

As can be understood from FIGS. 5 and 7, the orientation of the engagement surfaces 48 at the first angle 72 with respect to the actuation axis 60 causes the engagement surfaces 48 to be tilted generally toward the first reference axis 64, and the engagement surfaces 48 can be said to be tilted in a generally inboard direction with respect to the first reference axis 64. Similarly, the orientation of the engagement surfaces 48 at the second angle 76 with respect to the actuation axis 60 causes the engagement surfaces 48 to be oriented in a direction generally toward the second reference axis 68 and to be oriented in a generally inboard direction with respect to the second reference axis 68.

It is noted that the engagement surface 48 of one key 8 might not be oriented parallel with the engagement surface 48 of another key 8. As a general matter, however, in the exemplary depicted embodiment the orientations of the engagement surfaces 48 are axisymmetric with respect to the first reference axis 64. Accordingly, two keys 8 at mirror image positions with respect to the first reference axis 64 might have the same second angle 76 but might have opposite first angles 72. Numerous variations are possible.

Many of the keys 8 are each of a generally parallelogram shape having a first corner 80, a second corner 84, a third corner 86, and a fourth corner 88. The first and second corners 80 and 84 of each key can be said to be disposed relatively closer to the first reference axis 64 than the third and fourth corners 86 and 88, with the first corner 80 being disposed relatively closer to the second reference axis 68 than the second corner 84. The first and third corners 80 and 86 are disposed relatively closer to the second reference axis 68 than the second and fourth corners 84 and 88, with the first corner 80 being disposed relatively closer to the first reference axis 64 than the third corner 86. It thus can be seen that the first, second, and third corners 80, 84, and 86 are each disposed relatively closer to either or both of the first reference axis 64 and the second reference axis 68 than the fourth corner 88. The engagement surfaces 48 are each substantially planar, and the first, second, third, and fourth corners of the engagement surface 48 thus are coplanar.

In the exemplary embodiment depicted in FIGS. 1-7, the fourth corners 88 of the keys 8 protrude outwardly, i.e., in the actuation axis 60 away from the handheld electronic device 12, and thus can be readily located both tactually and visually by a user. That is, a predetermined portion of any given key 8, i.e., the fourth corner 88, protrudes away from the keypad 4 farther than any other portion of the given key 8. Such orientation of the engagement surfaces 48 thus facilitates identification and actuation of the keys 8 despite the keys 8 being small. This facilitates operation of the handheld electronic device 12.

Since the first reference axis 64 and the second reference axis 68 each extend across the handheld electronic device 12, i.e., rather than being spaced from the handheld electronic device 12, an orientation of the engagement surfaces 48 generally toward the first reference axis 64 and the second reference axis 68 result in the engagement surfaces 48 being oriented in a generally inboard direction with respect to the first reference axis 64 and the second reference axis 68. If the engagement surfaces faced generally away from the first reference axis 64, with the first reference axis 64 extending across the handheld electronic device 12, such engagement surfaces could be said to be oriented in a generally outboard direction with respect to the first reference axis 64. An alternate embodiment wherein the engagement surfaces are oriented in a generally outboard direction with respect to either or both of the first reference axis 64 and the second reference axis 68, with the first reference axis 64 and the second reference axis 68 extending across the handheld electronic device 12, would still be within the scope of the disclosed and claimed concept since one of the first, second, third, and fourth corners 80, 84, 86, and 88 would still protrude outwardly from the handheld electronic device 12 generally in the actuation axis 60 farther than the other three corners of the key 8. In this regard, it is understood that the orientation of the engagement surfaces 48 in an oblique fashion from the actuation axis 60 with respect to both the first reference axis 64 and the second reference axis 68, whether in inboard or outboard directions with respect thereto, results in each such key 8 having a protruding corner that can be visually and tactually identified by a user to facilitate actuation thereof and to facilitate operation of the handheld electronic device 12.

As can further be understood from FIGS. 5 and 7, and for many of the keys 8, the engagement surface 48 of a given key is disposed adjacent the skirt surfaces 44 of two other keys 8 disposed adjacent the given key 8. Since the skirt surface 44 of each key 8 is oriented substantially parallel with the actuation axis 60, such a relationship between the engagement surface 48 of one key and the skirt surfaces 44 of two adjacent keys 8 helps a user to visually and tactually distinguish one key 8 from another key 8, thus facilitating operation of the keypad 4 and of the handheld electronic device 12. It can further be seen that for any given key 8 having its engagement surface 48 disposed adjacent the skirt surfaces 44 of two keys 8 adjacent thereto, one of the adjacent keys 8 is spaced from the given key 8 in a direction generally parallel with the first reference axis 64, and the other adjacent key is spaced from the given key 8 in a direction generally parallel with the second reference axis 68.

As is best shown in FIG. 5, the keys 8 of any given column 52 could each be said to comprise a beginning edge 92 that extends between the first and second corners 80 and 84 and an end edge 96 that extends between the third and fourth corners 86 and 88. The end edge 96 of any given key 8 is higher than the beginning edge 92 of the key 8 when considered in a direction along the actuation axis 60 from the interior of the handheld electronic device 4. It also can be seen that the end edge 96 of a given key 8 is similarly higher than an adjacent beginning edge 92 of a key 8 in an adjacent column 52. The keys 8 thus are arranged in a stepped layout in a direction along the rows 56.

Similarly, the keys 8 of any given row 56 could each be said to comprise a northern edge 94 that extends between the first and third corners 80 and 86 and a southern edge 98 that extends between the second and fourth corners 84 and 88. The southern edge 98 of any given key 8 is higher than the northern edge 94 of the key 8 when considered in a direction along the actuation axis 60 from the interior of the handheld electronic device 4. It also can be seen that the southern edge 98 of a given key 8 is similarly higher than an adjacent northern edge 94 of a key 8 in an adjacent row 56. The keys 8 thus are additionally arranged in a stepped layout in the direction of the columns 52. It is noted, however, that the relationships between the beginning and end edges 92 and 96 and/or the relationship between the northern and southern edges 94 and 98 could be opposite that depicted herein without departing from the present concept.

An improved keypad 104 in accordance with a second embodiment of the disclosed and claimed concept is indicated generally in FIGS. 8-12. The keypad 104 is similar to the keypad 4, except that the outer surfaces 140 of the keys 108 further comprise a relief surface 150 in addition to the engagement surface 148. The relief surface 150 is disposed adjacent both the skirt surface 144 and the engagement surface 148 of a given key 108, and is disposed generally between the skirt surface 144 and the engagement surface 148. The keypad 104 can be incorporated into the handheld electronic device 12 in place of the keypad 4.

As can be seen in FIGS. 8-12, the relief surface 150 in the exemplary embodiment extends to and is disposed adjacent the skirt surface 144 of a given key along two adjacent sides of the key 8, and the engagement surface 148 extends to and is disposed adjacent the skirt surface 144 of the key along the other two adjacent sides of the key 8.

It can further be understood from the accompanying figures that the relief surface 150 is oriented in directions opposite the engagement surface 148 with respect to the actuation axis 160, the first reference axis 164, and the second reference axis 168. That is, the engagement surface 148 and the relief surface 150 are both oriented oblique to the actuation axis 160 of a given key. While in the depicted exemplary embodiment the engagement surface 148 is oriented in a direction generally toward both the first reference axis 164 and the second reference axis 168, the relief surface 150 extends in a direction generally away from the first reference axis 164 and the second reference axis 168. As such, the exemplary relief surface 150 can be said to face in a generally outboard direction with respect to each of the first reference axis 164 and the second reference axis 168.

It can be seen that the keys 108 each have a protruding portion 170 that protrudes generally in the actuation axis 160 away from the handheld electronic device into which the keypad 104 is incorporated, although the protruding portion 170 of a given key 108 is not coincident with any of the corners of the given key 108. Rather, such protruding portion 170 is disposed at an interior portion of the given key 108 rather than being disposed at a corner thereof. By moving the protruding portion 170 inboard of the corners of a given key 108, the position at which the engagement surface 148 is actuated by a user is generally relatively closer to the center of a given key 108 than would generally be the case with the keys 8. The keys 108 thus can be actuated more comfortably and more easily than the keys 8.

Since the engagement surface 148 is substantially planar, the presence of the relief surface 150 causes the engagement surface 148 to be relatively smaller in area than would be the case in the absence of the relief surface 150, i.e., if the keys 108 were configured like the keys 8. The potentially smaller surface area of the engagement surface 148 potentially could be said to provide less area for the user to engage when actuating the keys 108. However, such a potentially smaller surface area of the engagement surface 148 is offset by the increased ease with which the keys 108 can be actuated, when compared with the keys 8, by moving the protruding portion 170 inboard of the corners of the keys 108. Such potentially smaller surface area is further offset by the protruding portion 170 being relatively softer, i.e., less sharp, than the fourth corners 88 of the keys 8 and thus being relatively easier to actuate when compared with the keys 8. That is, the protruding portions 170 provide a less focused reaction force to the fingers of a user when actuated.

Figure 14:
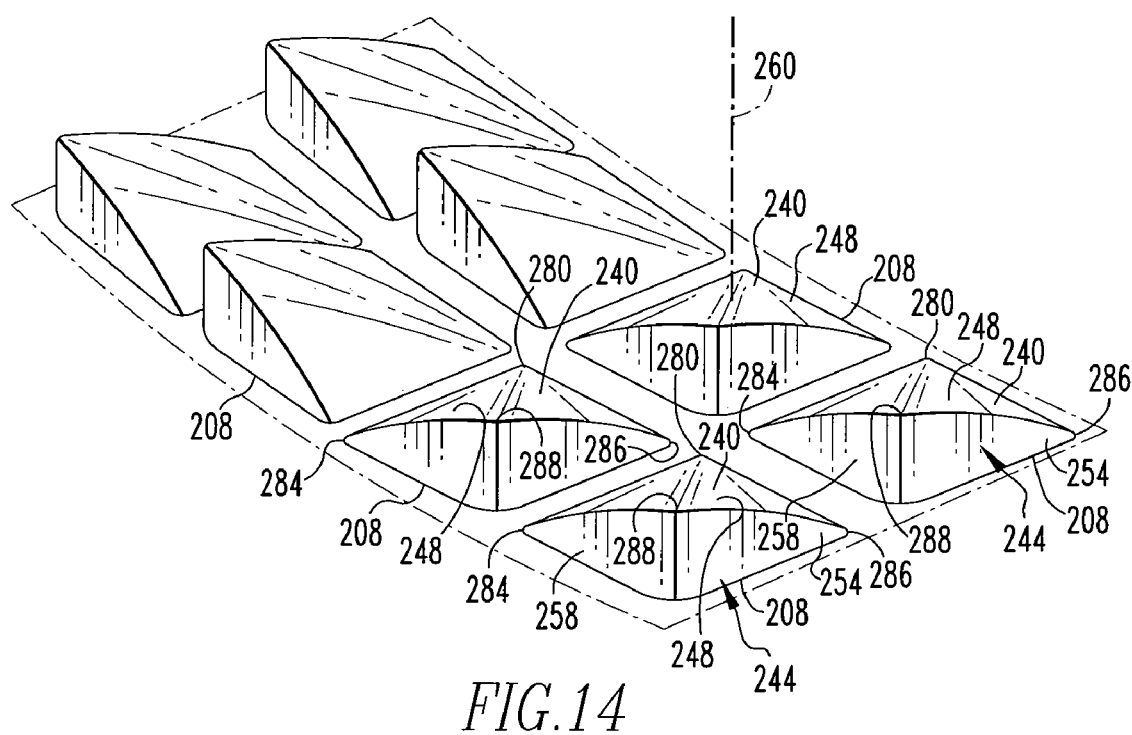
FIG. 14 is a perspective view of a portion of the keypad of FIG. 13.

An improved keypad 204 in accordance with a third embodiment of the disclosed and claimed concept is depicted generally in FIGS. 13 and 14. The keypad 204 can be incorporated into the handheld electronic device 12 in place of the keypad 4. The keypad 204 is similar to the keypad 4, except that the engagement surfaces 248 of the keys 208 are of an arcuate, i.e., convex, shape rather than being planar. The outer surfaces 240 thus are of an arcuate, i.e., convex shape.

It can be seen that a portion of the engagement surface 248 is oriented in a direction generally toward to the first reference axis 264, and that another portion of the engagement surface 248 is oriented in a direction generally toward the second reference axis 268. The skirt surface 244 can be said to include a first lateral surface 254 and a second lateral surface 258. The first and second lateral surfaces 254 and 258 extend in a direction generally parallel with the actuation axis 260. In the depicted exemplary embodiment, the first lateral surface 254 is substantially planar, while the second lateral surface 258 is slightly arcuate.

It can be seen that the first corner 280, the second corner 284, and the third corner 286 of any given key 208 lie in a plane that is oriented substantially perpendicular to the actuation axis 260, and that the fourth corner 288 is spaced in the actuation axis 260 away from such plane.

It thus can be seen that the outer surfaces 240 of the keys 208 are of a relatively smooth curvature, and thus, when actuated by a user, provide less of a concentration of reaction force on the user's finger than either the protruding portions 170 of the keys 108 or the fourth corners 88 of the keys 8. Actuation of the keys 208 thus will be relatively easier, i.e., more comfortable to a user, than actuation of the keys 108 or the keys 8.

It is noted that the three keypad 4, 104, and 204 have been depicted as comprising enough keys 8, 108, and 208 to provide a full QWERTY keyboard, i.e., they are depicted as having enough keys such that generally each character of a QWERTY keyboard could be assigned to an individual key 8, 108, or 208. It is noted, however, that the keypads 4, 104, and 204 need not be configured with so many keys 8, 108, and 208. For instance, the fourth corners 88 of the keys 8 can be said to provide a greater degree of visual and tactile distinction between one key 8 and an adjacent key 8 than is provided by the protruding portion 170 of the keys 108 or by the fourth corners 288 of the keys 208. The keys 8 thus might advantageously be employed in an environment of a touch-tone telephone keypad wherein the keys could be made relatively small yet still highly distinguishable, both visually and tactually, from one another. The fact that such keys are relatively less comfortable to actuate than the other embodiments of the keys depicted herein is counterbalanced by the fact that a user typically would actuate telephone keys during operation of a telephone application, and the number of key actuations needed during operation of a telephone application typically would be fewer than the number of key actuations that might be required during operation of a text entry routine. While a telephone device may have a text entry routine available thereon for limited use, the far more prevalent use of such a touch-tone telephone keypad would be for use during a telephone application, with the result that the keys 8 would be highly distinguishable from one another. The keys 8 can, of course, be employed in any type of keypad without departing from the disclosed and claimed concept.

The keys 108 of the keypad 104, being relatively easier to actuate than the keys 8 of the keypad 4, might be advantageously suited to use in a reduced keyboard application. As employed herein, the expression "reduced" and variations thereof in the context of a keypad refers to a keypad wherein multiple linguistic elements such as letters and the like are assigned to a given key. As such, and in the context of a reduced QWERTY keyboard, pairs of letters such as "A" and "S" would be assigned to the same key, and the letters "E" and "R" would similarly both be assigned to another key. The keys 108 would be relatively more comfortable to be actuated than the keys 8, which would more advantageously suit them to use in an application wherein text entry, such as during operation of a text entry routine, is a prevalent usage of the resultant handheld electronic device. The keys 108 are highly distinguishable, both visually and tactually, from one another, and are very easily actuated. The keys 108 can, of course, be employed in any type of keypad without departing from the disclosed and claimed concept.

The keys 208 of the keypad 204 can advantageously be employed in a full QWERTY keyboard or in other applications. Since the keys 208 are relatively easier to actuate than the keys 108 or 8, their application in a full keyboard application indicates that their use is highly advantageous in an application where the intended primary function of a handheld electronic device is text entry. The keys 208 still are visually and tactually distinguishable from one another, which facilitates actuation and operation of such a resultant handheld electronic device. The keys 208 can, of course, be employed in any type of keypad without departing from the disclosed and claimed concept.

Any of the keypads 4, 104, and 204 can have greater or lesser numbers of keys 8, 108, and 208 than are expressly depicted herein. Also, any of the keypads 4, 104, and 204 can be employed in any application.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A keypad for a handheld electronic device, the keypad comprising:
   a plurality of keys, at least some of the keys each being actuatable along an actuation axis, the key in an actuated condition being structured to provide an input to the handheld electronic device;
   at least some of the keys each having an outer surface that comprises an engagement surface structured to be engaged in actuating the key, the engagement surface being oriented oblique to the actuation axis of the key and facing generally:
      in a direction that is one of toward and away from a first reference axis of the keypad, and
      in a direction that is one of toward and away from a second reference axis of the keypad, the first reference axis and the second reference axis being nonparallel;
      wherein at least a portion of the engagement surface has a generally convex shape;
      wherein at least some of the keys are each of a generally parallelogram shape and wherein the engagement surface substantially extends to three corners of the key, the three corners together being in a plane oriented substantially perpendicular to the actuation axis of the key; and
      wherein the three corners of the key are each disposed closer to at least one of the first reference axis and the second reference axis than a fourth corner of the key;
   wherein at least some of the keys each have a skirt surface;
   wherein at least a portion of the engagement surface of a key being disposed adjacent at least a portion of the skirt surface of the key; and
   wherein for at least some of the keys, the engagement surface of a given key being disposed adjacent a skirt surface of each of at least two keys adjacent the given key.

2. The keypad of claim 1 wherein a grouping of the keys are arranged in one of a row and a column, one of the first reference axis and the second reference axis being oriented substantially parallel with the one of a row and a column.

3. The keypad of claim 2 wherein another grouping of the keys are arranged in the other of a row and a column, the other of the first reference axis and the second reference axis being oriented substantially parallel with the other of a row and a column.

4. The keypad of claim 3 wherein:
   the first reference axis extends generally centrally through the keypad;
   the second reference axis extending generally adjacent the keypad between the keypad and a display of the handheld electronic device;
   the engagement surfaces of at least some of the keys facing generally in a direction toward the first reference axis and toward the second reference axis.

5. The keypad of claim 4 wherein the engagement surfaces of said at least some of the keys are oriented generally in an inboard direction with respect to the first reference axis and with respect to the second reference axis.

6. The keypad of claim 2 wherein the first reference axis and the second reference axis are oriented substantially perpendicular to one another.

7. The keypad of claim 1 wherein the first reference axis is a north-south axis extending generally centrally through the keypad, and wherein the second reference axis is an east-west axis disposed adjacent the keypad, at least some of the keys each facing generally in a direction toward the first reference axis and toward the second reference axis.

8. A handheld electronic device comprising a reduced keyboard in accordance with the keypad of claim 1.

9. The keypad of claim 1 wherein one of the at least two keys adjacent the given key is spaced from the given key in a direction parallel with the first reference axis, and wherein the other of the at least two keys adjacent the given key is spaced from the given key in a direction parallel with the second reference axis.

10. The keypad of claim 1 wherein, for at least some of the keys, the outer surface further comprises a relief surface disposed adjacent the engagement surface and facing generally:
   in a direction that is the other of toward and away from the first reference axis of the keypad, and
   in a direction that is the other of toward and away from the second reference axis of the keypad.

11. The keypad of claim 10 wherein:
   at least some of the keys each have a skirt surface;
   at least a portion of the engagement surface of a key being disposed adjacent at least a portion of the skirt surface of the key; and
   at least a portion of the relief surface of a key being disposed adjacent at least a portion of the skirt surface of the key.

12. The keypad of claim 11 wherein:
   the outer surface of a key extending to the skirt surface of the key;
   the engagement surface extending to the skirt surface along two sides of the key;
   the relief surface extending to the skirt surface along the other two sides of the key.

13. The keypad of claim 10 wherein the relief surface is disposed between at least a portion of the engagement surface and at least a portion of the skirt surface.

14. A handheld electronic device comprising a full keypad in accordance with the keypad of claim 10.

15. A handheld electronic device comprising a touch-tone telephone keypad in accordance with the keypad of claim 1.

16. The keypad of claim 1 wherein the engagement surface is substantially planar.

* * * * *

UNITED STATES PATENT AND TRADEMARK OFFICE
CERTIFICATE OF CORRECTION

| | | |
|---|---|---|
| PATENT NO. | : 8,254,564 B2 | Page 1 of 1 |
| APPLICATION NO. | : 11/554331 | |
| DATED | : August 28, 2012 | |
| INVENTOR(S) | : Roman P. Rak et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1291 days.

Signed and Sealed this
Twenty-eighth Day of October, 2014

Michelle K. Lee
*Deputy Director of the United States Patent and Trademark Office*